Dec. 26, 1922.

J. A. GRAY.
TIMED FEED MECHANISM.
FILED SEPT. 8, 1916.

WITNESS.
J. D. Thornburgh.

INVENTOR.
James A. Gray
BY
N. A. Acker
ATTORNEY.

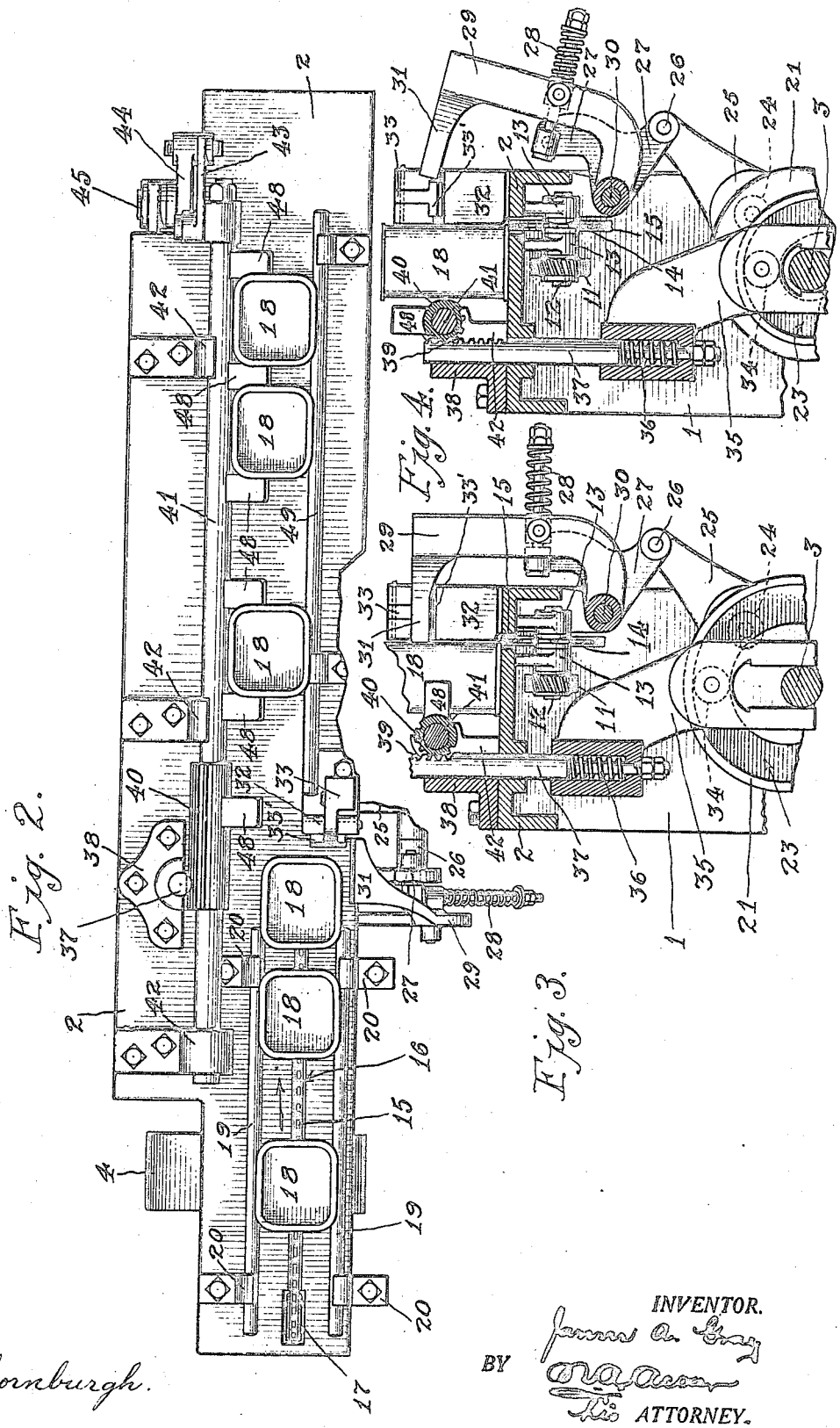

Patented Dec. 26, 1922.

1,440,288

UNITED STATES PATENT OFFICE.

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY.

TIMED FEED MECHANISM.

Application filed September 8, 1916. Serial No. 119,064.

*To all whom it may concern:*

Be it known that I, JAMES A. GRAY, a citizen of the United States, residing at the city and county of San Francisco, and State of California, have invented certain new and useful Improvements in Timed Feed Mechanisms, of which the following is a specification.

The present invention relates to a feeding mechanism, and more particularly to a device for receiving a succession of objects and advancing the same by a series of timed movements in spaced successive relation.

The invention is particularly applicable to canning and can-making machinery, and in the preferred form hereinafter described and herewith illustrated, is constructed to operate upon cans of the type used for the preservation of food products and other materials. Its use is not so limited, however, since it may be employed in the handling of objects other than cans.

The object of the invention is to provide a simple and practicable machine for feeding a spaced succession of objects by a series of timed intermittent movements, to do away with the necessity of manual labor in the handling and feeding of such objects.

In order to more fully comprehend the invention, reference should be had to the accompanying sheets of drawings, wherein:

Fig. 2 is a plan view of the machine.

Fig. 3 is a transverse section showing the operative mechanism after having moved a can into engagement with the reciprocating feed bar.

Fig. 4 is a transverse section similar to Fig. 3, showing the operative mechanism locked in inoperative position by the can trip.

Figure 1:
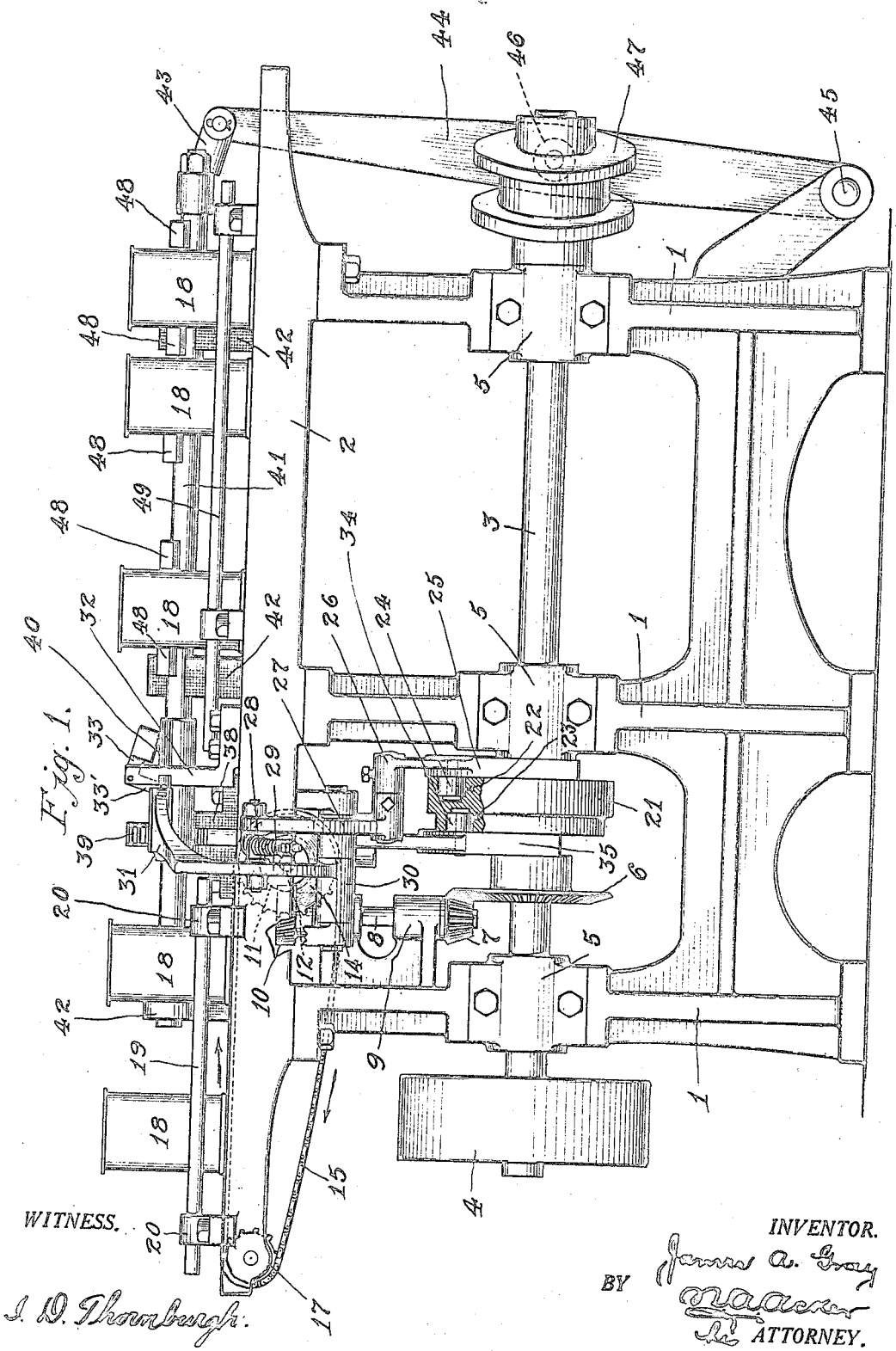
Fig. 1 is a side elevation of the machine in its preferred form, certain parts being shown in section for the sake of clearness.

In the drawings, the reference numeral 1 designates a suitably constructed supporting frame, upon which is a table 2. A horizontally disposed drive-shaft 3, Fig. 1 of the drawings, provided with a belt pulley 4 for receiving power from an outside source, not shown in the drawings, is carried in suitable journals 5 supported by the frame 1, and is provided with a bevel gear 6, which meshes with a co-working bevel gear 7 fixed upon the lower end of a short vertical shaft 8, the latter being carried in a suitable journal bracket 9.

The upper end of said vertical shaft 8 carries a spiral gear 10, which meshes with a corresponding gear 11 mounted upon a short horizontal shaft 12, Figs. 3 and 4 of the drawings. Said horizontal shaft 12 is supported within suitable journals 13, and carries a sprocket 14. A feed chain 15, whose upper run lies within a groove 16 in the table 2, passes over said sprocket 14 and an idler sprocket 17, and is continuously driven by said sprocket 14 in the direction indicated by the arrows in Figs. 1 and 2 of the drawings, to act as a conveyer for cans 18, the latter being placed upon said feed chain in any suitable manner not shown in the drawings. Guide rails 19, suitably supported by brackets 20, are provided to constrain said cans 18 to their proper path.

Mounted upon the drive-shaft 3 is a cam member 21, Figures 1, 3 and 4 of the drawings, provided on each face with cam grooves 22 and 23. A cam-following roller 24 is adapted to lie within the groove 22, and is mounted upon a yoke 25 whose lower end straddles the drive-shaft 3, and whose upper end is pivotally connected at 26 with bell-crank 27. Said bell-crank is flexibly connected by means of a spring 28 with an upwardly projecting transfer lever 29 fulcrumed at 30, and carrying at its upper end an inwardly extending arm 31. Mounted upon a bracket 32, fixed to the table 2 is a swinging trigger member 33 whose lower end 33' is positioned to engage the projecting arm 31 of the transfer lever 29, and by so doing, to hold said lever against inward movement, as shown in Fig. 4 of the drawings.

The lower end 33' of the trigger 33 lies in the path of the advancing cans 18 and is adapted to be engaged thereby and moved out of the way of the arm 31 of the transfer lever 29. Thus, when a can 18 is brought into the machine by the feed chain 15, and strikes against the trigger 33, said trigger releases the lever 29, so that upon the next movement of the bell-crank 27, actuated by the cam 21, the can 18 is moved transversely by the inwardly projecting arm 31 of said lever 29, to carry said can off the feed-chain 15. If no can is present to release the trigger 33, the spring 28 permits the bell-crank 27 to complete its movement without actuating the lever 29.

A cam-following roller 34, Figs. 1, 3, and 4 of the drawings, adapted to lie within the cam groove 23, is carried by a yoke 35, whose lower end straddles the drive-shaft 3, and whose upper end is flexibly connected by means of a spring 36, Figures 3 and 4 of the drawings, with a vertically disposed rod 37 carried for sliding movement within a guide 38. The upper end of said rod 37 projects above the table 2 and is formed with a rack portion 39 adapted to mesh with a pinion 40 mounted upon a horizontally disposed feed bar 41.

Said feed bar 41 is carried in suitable journals 42 within which it has both longitudinal and rotative reciprocating motion. The end of said feed bar 41 is connected by means of a link 43 to a lever 44 fulcrumed at 45, Fig. 1 of the drawings, and carrying a cam-following roller 46 adapted to lie within the groove of a cam member 47 mounted upon the end of the drive shaft 3. Thus the feed bar 41 is lineally reciprocated through the agency of the lever 44 and the cam 47 by the rotation of the drive-shaft 3, and at the same time is oscillated, through the agency of the cam groove 23 and the vertical rod 37. The pinion 40 has sufficient length, as shown in Figs. 1 and 2 of the drawings, to permit the oscillation of the feed-bar 41 to take place in any lineal position thereof.

The feed bar 41 carries a series of spaced projecting lugs 48, the distance between adjacent lugs of said series being approximately equal to the width of the cans 18. Thus when a can 18 is moved tranversely off the feed chain 15, by the lever 29, said can enters between two of the lugs 48 of the feed-bar 41. Said bar 41 is then moved toward the right, as seen in Figures 1 and 2 of the drawings, to advance the can 18 one step, and is oscillated to raise the lugs 48 to free the same from the can 18. The bar 41 is then returned to its original position by lineal movement, followed by oscillatory movement. This return movement of the feed-bar 41 places the first can 18 between the second pair of lugs 48. A second can 18 is then moved by the lever 29 to a position between the first pair of lugs 48 and the cycle of operation of the feed-bar 41 is repeated. Thus it will be readily understood that at each movement of the feed bar 41, the cans 18 carried in an engagement therewith are advanced one step, finally reaching the end of said feed-bar, and being removed therefrom by any suitable means not shown in the drawings. A guide-rail 49, Figures 1 and 2 of the drawings, is provided to retain the cans 18 in engagement with the lugs 48 of the feed-bar 41. In case the return oscillatory movement of the feed-bar 41 should cause one of the lugs 48 to strike against a can 18, the spring 36, Figures 3 and 4, will permit the full movement of the yoke 35 without injury to the can or the feed-bar 41.

Thus it will be seen that cans entering the machine on the feed chain 15 without timed or spaced relation, are transferred to the feed bar 41, and are advanced thereby in spaced succession by a series of timed step movements.

The invention has heretofore been described and is herewith illustrated in its preferred form. I do not wish to be construed as limiting myself thereto, however, for the reason that changes of form and construction may be made in the invention without departing from the spirit thereof, and I therefore desire to be understood as claiming the invention as broadly as the state of the prior art will permit.

Having thus described my invention, what I claim as new and desire to protect by Letters Patent is:—

1. In an apparatus for the described purpose, continuously operating conveyer means for receiving and feeding a series of objects, reciprocating conveyer means positioned in parallelism with said feed conveyer for advancing and discharging said objects by a succession of intermittent movements, and devices for transferring said objects successively from said feed conveyer to said discharge conveyer.

2. In an apparatus for the described purpose, continuous lineally movable conveyer means for receiving and positioning an object, lineally reciprocating conveyer means, for operating in a direction parallel to said continuous conveyer, for advancing said object by a succession of intermittent movements, and devices for moving said object transversely, to transfer the same from said continuous conveyer to said reciprocating conveyer.

3. In an apparatus for the described purpose, continuous lineally movable conveyer means for receiving and positioning an object, lineally reciprocating conveyer means, operating in a direction parallel to said continuous conveyer, for advancing said object by a succession of timed intermittent movements, devices for moving said object transversely to transfer the same from said continuous conveyer to said reciprocating conveyer, and mechanism actuated by the positioned object for controlling the operation of said transferring devices.

4. The combination of a longitudinally reciprocating conveyor having spaced means for engaging simultaneously a succession of cans and the like, said conveyor being mounted to oscillate on an axis which is parallel with the direction of reciprocation, a support on which said cans are propelled, means for oscillating the conveyor to engage with and disengage from the cans at the intervals between its reciprocations, a feeding conveyor for advancing the cans to a point at the side of the reciprocating conveyor, a trigger which is engaged by the can at said point, and means controlled by said trigger for moving the can into the path of the said engaging means of the reciprocating conveyor.

5. The combination of a longitudinally reciprocating conveyor having spaced means for engaging simultaneously a succession of cans and the like, said conveyor being mounted to oscillate on an axis which is parallel with the direction of reciprocation, a support on which said cans are propelled, means for oscillating the conveyor to engage with and disengage from the cans at the intervals between its reciprocations, a continuous conveyor for advancing the cans to a point at the side of the reciprocating conveyor, a trigger which is engaged by the can at said point, means controlled by said trigger for pushing the can into the path of the said engaging means of the reciprocating conveyor, a longitudinal power shaft, devices connecting said shaft with the reciprocating conveyor to oscillate the same, and devices connecting said shaft with said pushing means to actuate the same.

In testimony whereof I have signed my name to this specification in the presence of two subscribing witnesses.

JAMES A. GRAY.

Witnesses:
N. A. ACKER,
D. B. RICHARDS.